UNITED STATES PATENT OFFICE.

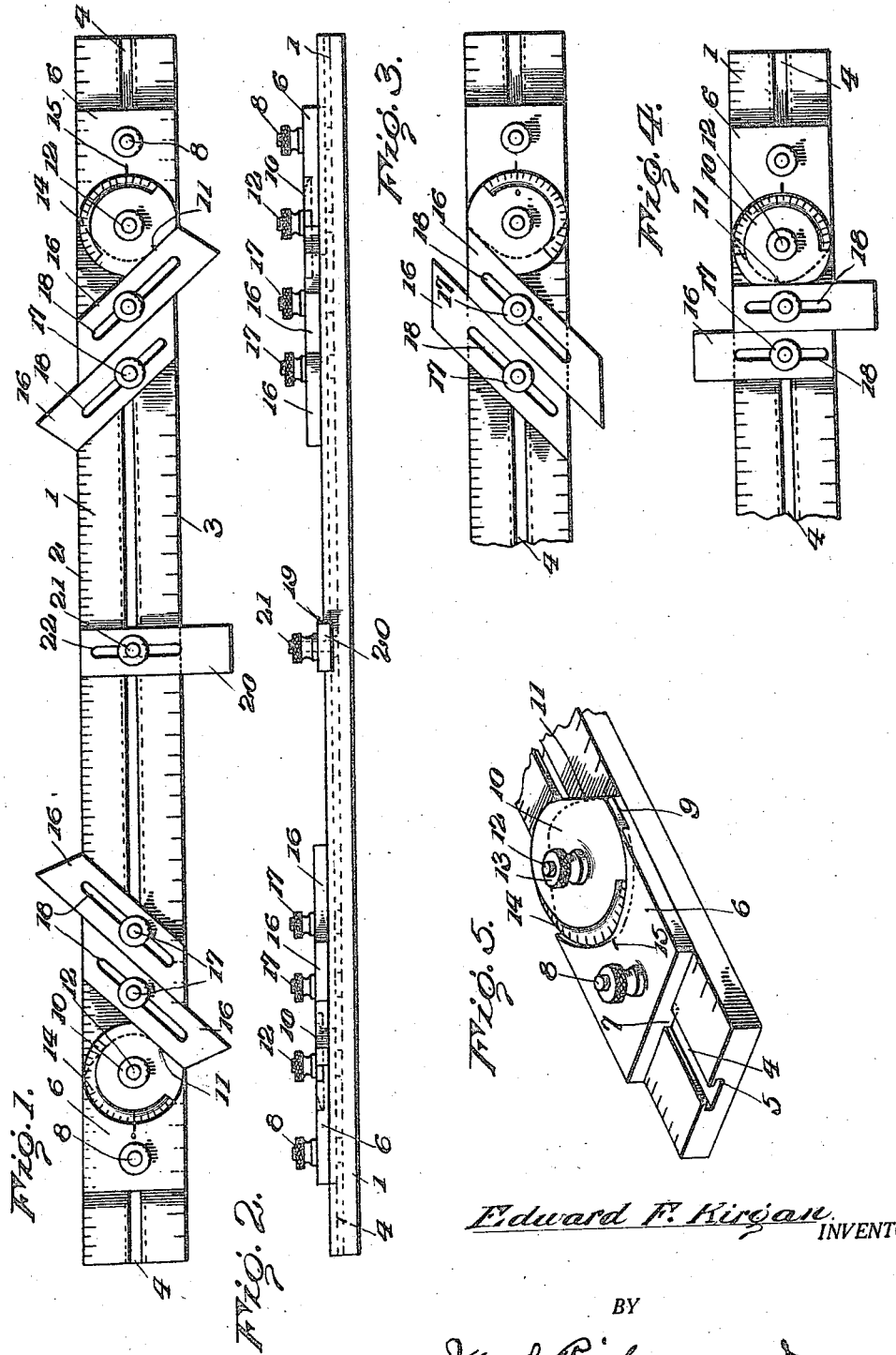

EDWARD F. KIRGAN, OF CINCINNATI, OHIO.

UNIVERSAL MEASURING IMPLEMENT.

1,416,473.　　　　Specification of Letters Patent.　Patented May 16, 1922.

Application filed November 15, 1920. Serial No. 424,092.

*To all whom it may concern:*

Be it known that I, EDWARD F. KIRGAN, a citizen of the United States, residing at Cincinnati, in the county of Hamilton and State of Ohio, have invented certain new and useful Improvements in Universal Measuring Implements, of which the following is a specification.

This invention relates to an improvement in measuring instruments of the straight edge rule type, wherein a protractor-carrying member is adapted for cooperation with the rule proper and designed to accurately control the position of one or more straight edge angle defining strips in their relation to the rule proper, to thus provide for the laying off of angles with certainty.

The rule proper is formed with a longitudinal under-cut channel, and protractor-carrying sections are adapted to slidably cooperate with said channel and be fixed with relation to the rule proper at any desired point in the length thereof. A protractor is carried by each section formed in part with a straight guide edge, so that in any angle indication of the protractor, such guide edge will be at the angle indicated with respect to the edges of the rule proper. Angle defining strips, designed for longitudinal and transverse adjustment with respect to the rule proper are designed to be brought into contact with the guide edge of the protractor, to thus arrange such strips for defining the particular angle with the rule edge for which the protractor is set.

In the drawings:—

Fig. 1 is a plan of the improved implement.

Fig. 2 is an edge view of the same.

Figs. 3 and 4 are broken plan views showing different angle arrangements of the angle defining strips.

Fig. 5 is a broken perspective showing the connection of the protractor-carrying sections.

The improved measuring implement comprises a rule proper 1, which may be of any desired size, and is preferably provided with distinct scale markings 2 and 3 on the respective longitudinal edges thereof. The rule proper is formed with a longitudinal channel 4, preferably extending throughout the full length of the rule, the walls of the channel being under-cut, as shown at 5, Fig. 5.

A protractor-carrying section 6, which may if desired be of the full width of the rule proper, is formed on its underside with a rib 7 to slidably cooperate with the channel 4, and with a securing means indicated at 8 and comprising a threaded bolt having a head engaging the under-cut portion 5 of the channel, and a nut to engage the threaded end of the bolt above the section. The section 6 is reduced in thickness at one end as at 9 to rotatably receive a protractor-disc 10, having a straight guide edge 11. The disc 10 is pivotally supported on the section 6 by a bolt 12 provided with a locking nut 13 whereby the protractor-disc may be secured in a desired rotative adjustment. The edge of the disc is provided with the usual scale marking 14 to cooperate with a fixed mark 15 on the section. The scale markings are such that with the protractor-disc indicating a particular angle, the guide edge 11 of such disc will form such indicated angle with the respective edges of the rule proper.

Angle defining strips, preferably in duplicate as 16, are formed to cooperate with the rule proper through securing means 17, similar to the means 8 heretofore described, each strip 16 being formed with a longitudinal slot 18 to permit a transverse adjustment of the strips with respect to the rule.

In a commercial construction of the implement, the angle defining strips, protractor, and protractor-carrying sections will be duplicated at each end of the rule, though of course it is understood that this duplication is not an essential part of the present invention.

It is apparent from this arrangement that the protractor can be adjusted to any desired angle, and the particular strip 16 next the protractor adjusted to bear upon the guide edge 11, whereupon that portion of the strip projecting beyond the rule edge, will define with such edge the indicated angle. By duplicating the strip 16, it is apparent that one strip may project beyond one edge of the rule and the other strip beyond the other edge, thus providing for the indicated angle beyond both edges of the rule.

The rule is also preferably formed about centrally of its length with a transverse channel 19, disposed at right angles to the edges of the rule and slidably receiving a strip 20, adapted to be secured by a securing means 21, with such strip longitudinally slotted at 22. The strip 20 will thus remain at right angles to the edges of the rule, and may be obviously adjusted to project beyond the particular edge to define a right angle, for measurement or marking..

Through the use of the implement described, it is apparent that any desired angular marking may be readily provided for, the adjustment necessary to this end being secured in a simple and convenient manner. Furthermore the protractor-sections may be adjusted to any position longitudinally of the rule in order that the contemplated angle may be marked at any desired point of linear measurement on the rule. The strips 16 and 20 may be of any length, and the securing means may be of any desired type.

Claims:

1. A measuring implement comprising a rule proper formed with a longitudinal channel, a protractor-carrying section slidably cooperating with said channel, means for fixing said section in adjusted position on the rule, a protractor-disc carried by the section and having a guide edge, a strip slidably and transversely adjustable with respect to the rule and adapted to cooperate with said guide edge, and means for securing the strip in adjusted position.

2. A measuring implement comprising a rule proper, a protractor-carrying section adjustable lengthwise of said rule, a protractor carried by said section and having a guide edge, the guide edge defining, with the rule edges, the protractor indicating angle, an angle defining strip adjustable with respect to the rule to cooperate with said guide edge, and a second angle defining strip adjustable with respect to the rule to cooperate with the first-mentioned strip, said rule being formed with a transverse channel at right angles to the rule edges, and a strip seated in said channel and adjustable transversely of the rule.

In testimony whereof I affix my signature.

EDWARD F. KIRGAN.